(12) United States Patent
Urano

(10) Patent No.: US 8,970,069 B2
(45) Date of Patent: Mar. 3, 2015

(54) WIRELESS POWER RECEIVER AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 712 days.

(21) Appl. No.: 13/073,535

(22) Filed: Mar. 28, 2011

(65) Prior Publication Data

US 2012/0248882 A1    Oct. 4, 2012

(51) Int. Cl.
*H02J 17/00* (2006.01)
*H01F 38/14* (2006.01)
*H02J 5/00* (2006.01)

(52) U.S. Cl.
CPC ............... *H01F 38/14* (2013.01); *H02J 5/005* (2013.01)
USPC ........................................................ 307/104

(58) Field of Classification Search
USPC ........................................................ 307/104
See application file for complete search history.

(56) References Cited

U.S. PATENT DOCUMENTS

| | | | |
|---|---|---|---|
| 6,118,651 A * | 9/2000 | Mehrotra et al. | 361/509 |
| 6,216,513 B1 * | 4/2001 | Nakamura et al. | 72/148 |
| 6,236,103 B1 * | 5/2001 | Bernstein et al. | 257/532 |
| 7,741,734 B2 | 6/2010 | Joannopoulos et al. | |
| 8,558,412 B2 * | 10/2013 | Kim et al. | 307/104 |
| 2007/0222542 A1 | 9/2007 | Joannopoulos et al. | |
| 2008/0211320 A1 | 9/2008 | Cook et al. | |
| 2008/0278264 A1 | 11/2008 | Karalis et al. | |
| 2009/0015075 A1 * | 1/2009 | Cook et al. | 307/149 |
| 2009/0045772 A1 | 2/2009 | Cook et al. | |
| 2009/0051224 A1 | 2/2009 | Cook et al. | |
| 2009/0058189 A1 | 3/2009 | Cook et al. | |
| 2009/0072627 A1 | 3/2009 | Cook et al. | |
| 2009/0072628 A1 | 3/2009 | Cook et al. | |
| 2009/0072629 A1 | 3/2009 | Cook et al. | |
| 2009/0079268 A1 | 3/2009 | Cook et al. | |
| 2009/0102292 A1 | 4/2009 | Cook et al. | |
| 2009/0134712 A1 | 5/2009 | Cook et al. | |
| 2009/0167449 A1 | 7/2009 | Cook et al. | |
| 2009/0179502 A1 | 7/2009 | Cook et al. | |
| 2009/0195332 A1 | 8/2009 | Joannopoulos et al. | |
| 2009/0195333 A1 | 8/2009 | Joannopoulos et al. | |
| 2009/0212636 A1 | 8/2009 | Cook et al. | |
| 2009/0213028 A1 | 8/2009 | Cook et al. | |
| 2009/0224608 A1 | 9/2009 | Cook et al. | |
| 2009/0224609 A1 | 9/2009 | Cook et al. | |
| 2009/0224856 A1 | 9/2009 | Karalis et al. | |
| 2009/0243397 A1 | 10/2009 | Cook et al. | |

(Continued)

FOREIGN PATENT DOCUMENTS

| | | |
|---|---|---|
| JP | 10-069533 A | 3/1998 |
| JP | 2003-078061 A | 3/2003 |

(Continued)

*Primary Examiner* — Jared Fureman
*Assistant Examiner* — Joel Barnett
(74) *Attorney, Agent, or Firm* — McDermott Will & Emery LLP

(57) ABSTRACT

Power is fed from a feeding coil to a receiving coil L3 by magnetic resonance. The receiving coil L3 and a capacitor C3 are connected in series to constitute a receiving coil circuit. A loading coil L4 electromagnetically coupled to the receiving coil L3 is connected to a load through a rectification circuit 142 to constitute a loading circuit. Placing the rectification circuit 142 on a first flat plate electrode 132 of the capacitor C3 allows heat generated from the rectification circuit 142 to escape to the first flat plate electrode 132.

18 Claims, 9 Drawing Sheets

(56) References Cited

U.S. PATENT DOCUMENTS

| | | |
|---|---|---|
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2010/0038970 A1 | 2/2010 | Cook et al. |
| 2010/0091462 A1 | 4/2010 | Imazato et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2012/0080957 A1* | 4/2012 | Cooper et al. ............... 307/104 |
| 2013/0119774 A1* | 5/2013 | Ichikawa ..................... 307/104 |

FOREIGN PATENT DOCUMENTS

| | | |
|---|---|---|
| JP | 2006-230032 | 8/2006 |
| WO | WO 2006/022365 A1 | 3/2006 |
| WO | 2008/099856 A1 | 8/2008 |

* cited by examiner

WIRELESS POWER RECEIVER AND WIRELESS POWER TRANSMISSION SYSTEM

BACKGROUND OF THE INVENTION

1. Field of the Invention

The present invention relates to a wireless power receiver for receiving power fed by wireless and a wireless power transmission system.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Pat. Appln. Publication No. 2008-0278264

[Patent Document 2] Jpn. Pat. Appln. Laid-Open Publication No. 2006-230032

[Patent Document 3] International Publication No. WO2006-022365

[Patent Document 4] U.S. Pat. Appln. Publication No. 2009-0072629

[Patent Document 5] U.S. Pat. Appln. Publication No. 2009-0015075

In order to take, not AC power, but DC power from a load, it is necessary to provide a rectification circuit between a loading coil and the load. The rectification circuit generates heat when converting the AC power received by the loading coil into DC power. In the case where power to be handled is large, the heat generation amount of the rectification circuit becomes large.

The present invention has been developed in consideration of the above-described issue, and a main object thereof is to effectively radiate heat generated from a power receiving side circuit by means of a simple mechanism in wireless power feeding of a magnetic field resonance type.

SUMMARY

A wireless power receiver according to the present invention receives, at a receiving coil, AC power fed from a feeding coil by wireless using a magnetic field resonance phenomenon between the feeding coil and receiving coil. The wireless power receiver includes a receiving coil circuit and a loading circuit. The receiving coil circuit includes a capacitor constituted by flat plate electrodes facing each other and the receiving coil. The loading circuit includes a loading coil that is magnetically coupled to the receiving coil to receive the AC power from the receiving coil and a load to which the AC power is supplied from the loading coil. A heating element included in the loading circuit is placed on one of the electrodes.

Placing the heating element of the loading circuit on one of the electrodes of the capacitor allows heat generated from the heating element to easily escape to the electrode. Any circuit element that is connected to the loading circuit can be targeted as the heating element. For example, the load may be placed on the electrode as the heating element. In the case where AC power of a low frequency is fed and received, the area of the electrode of the capacitor included in the receiving coil circuit can be increased to increase the heat capacity of the electrode. This allows the heating element to easily radiate heat. The capacitor is made to function as a heat sink, so that it is possible to achieve effective heat radiation with a simple mechanism but without providing any special heat radiation means.

The loading circuit may further include a rectification circuit that rectifies the AC power received by the loading coil and supplies the resultant power to the load. The rectification circuit may be placed on one of the electrodes. There may be a case where not AC power but DC power needs to be taken from a load. In this case, a rectification circuit needs to be provided, and this rectification circuit is likely to be a heating source. In the case where large AC power is fed and received, heat generation from the rectification circuit is particularly increased. Even in such a case, by allowing the heat generated from the rectification circuit to escape to the electrode of the capacitor, it is possible to achieve effective heat radiation with a simple mechanism.

A first electrode on the side on which the heating element is placed may have a plurality of protrusions. A second electrode opposite to the first electrode may also have a plurality of protrusions. The protrusions of the first electrode and those of the second electrode may face each other alternately.

Formation of such protrusions increases the surface area of each electrode, making it possible to more easily enhance the heat radiation effect.

The receiving coil may be wound outside the capacitor. The loading coil may be wound outside the receiving coil. Both or one of the receiving coil and loading coil may have a rectangular shape in coil cross-section.

Winding the coils each of which uses so-called a rectangular wire, can make the size of the wireless power receiver itself compact.

The receiving coil circuit may be formed as a circuit that resonates at a resonance frequency of the feeding coil.

A wireless power transmission system according to the present invention includes the abovementioned wireless power receiver, feeding coil, and a power supply circuit that supplies the AC power to the feeding coil.

The power supply circuit may supply the AC power from the feeding coil that does not substantially resonate with power feeding side circuit elements to the receiving coil. The "does not substantially resonate" mentioned here means that the resonance of the feeding coil is not essential for the wireless power feeding, but does not mean that even an accidental resonance of the feeding coil with some circuit element is eliminated. A configuration may be possible in which the feeding coil does not constitute a resonance circuit that resonates with power feeding side circuit elements at a resonance point corresponding to the resonance frequency of the receiving coil. Further, a configuration may be possible in which no capacitor is inserted in series or in parallel to the feeding coil.

The feeding coil may be connected to the capacitor to constitute a circuit that resonates at the resonance frequency of the receiving coil circuit.

It is to be noted that any arbitrary combination of the above-described structural components and expressions changed between a method, an apparatus, a system, etc. are all effective as and encompassed by the present embodiments.

According to the present invention, it is possible to easily and effectively radiate heat generated from a power receiving side circuit with a simple mechanism in a wireless power feeding technique of a magnetic field resonance type.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be described with reference to the accompanying drawings.

First Embodiment

Figure 1:
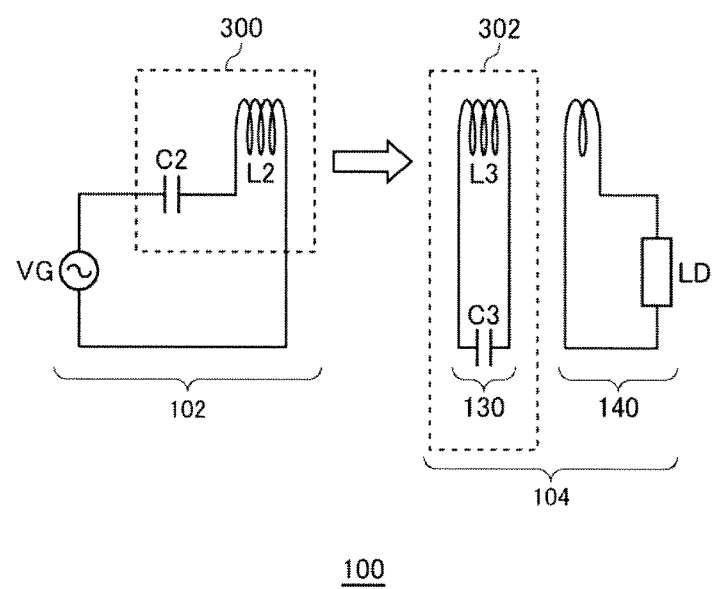
FIG. 1 is a view illustrating operation principle of a wireless power transmission system according to a first embodiment of the present invention.

FIG. 1 is a view illustrating operation principle of a wireless power transmission system 100 according to a first embodiment. The wireless power transmission system 100 includes a wireless power feeder 102 and a wireless power receiver 104. The wireless power feeder 102 includes a power feeding LC resonance circuit 300. The wireless power receiver 104 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, power feeding coil L2, capacitor C3, and power receiving coil L3 are set such that the resonance frequencies of the power feeding LC resonance circuit 300 and power receiving LC resonance circuit 302 coincide with each other in a state where the power feeding coil L2 and power receiving coil L3 are disposed away from each other far enough to ignore the magnetic field coupling therebetween. This common resonance frequency is assumed to be fr0.

In a state where the power feeding coil L2 and power receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 102 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the power feeding coil L2 generates an AC magnetic field of the resonance frequency fr1. The power receiving LC resonance circuit 302 constituting a part the new resonance circuit also resonates by receiving the AC magnetic field. When the power feeding LC resonance circuit 300 and power receiving LC resonance circuit 302 resonate at the same resonance frequency fr1, wireless power feeding from the power feeding coil L2 to power receiving coil L3 is performed with the maximum power transmission efficiency. Received power is taken from a load LD of the wireless power receiver 104 as output power. Note that the new resonance circuit can resonate not only at the resonance point 1 (resonance frequency fr1) but also at a resonance point 2 (resonance frequency fr2).

Although FIG. 1 illustrates a configuration in which the wireless power feeder 102 does not include an exciting coil L1, the basic operation principle of the wireless power feeder 102 is the same as in the case where the wireless power feeder 102 includes the exciting coil L1. A configuration in which the wireless power feeder 102 does not include an exciting coil L1 will be described later using FIG. 4.

Figure 2:
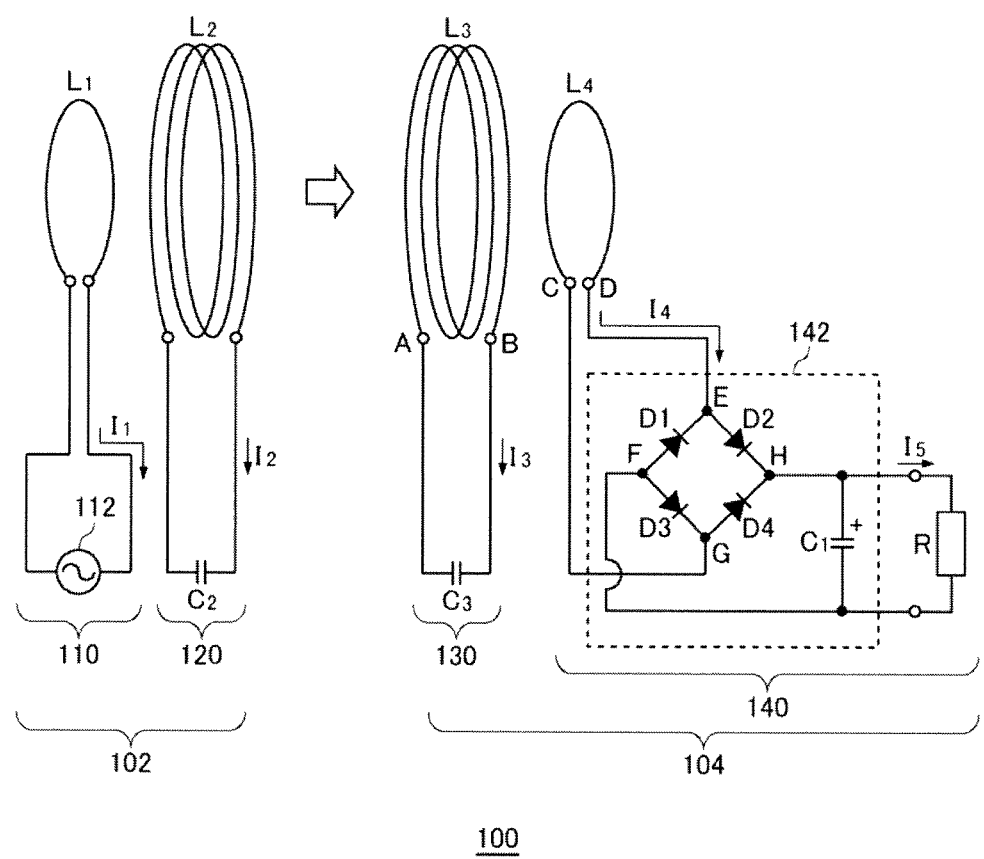
FIG. 2 is a system configuration view of the wireless power transmission system according to the first embodiment.

FIG. 2 is a system configuration view of the wireless power transmission system 100 in the first embodiment. The wireless power transmission system 100 includes a wireless power feeder 102 on the power feeding side and a wireless power receiver 104 on the power receiving side. The wireless power feeder 102 includes an exciting circuit 110 and a feeding coil circuit 120. The wireless power receiver 104 includes a receiving coil circuit 130 and a loading circuit 140. A distance of several meters is provided between the feeding coil circuit 120 and receiving coil circuit 130. The wireless power transmission system 100 mainly aims to feed power from a feeding coil L2 included in the feeding coil circuit 120 to the receiving coil L3 included in the receiving coil circuit 130 by wireless. The wireless power transmission system 100 according to the present embodiment is a system that is assumed to operate at a resonance frequency fr1 of 100 kHz. The wireless power transmission system 100 can operate in a high-frequency band such as ISM (Industry-Science-Medical) frequency band.

The exciting circuit 110 is a circuit in which an exciting coil L1 and an AC power supply 112 are connected in series. The exciting coil L1 receives AC power of the resonance frequency fr1 from the AC power supply 112. The number of windings of the exciting coil L1 is 1, cross-sectional shape of a coil conductor thereof is a rectangle of 0.2 mm×6.0 mm, and shape of the exciting coil L1 itself is a square of 210 mm×210 mm. In FIG. 2, the exciting coil L1 is represented by a circle for descriptive purpose. Other coils are also represented by circles for the same reason. All the coils illustrated in FIG. 2 are made of copper.

The feeding coil circuit 120 is a circuit in which the feeding coil L2 and a capacitor C2 are connected in series. The exciting coil L1 and feeding coil L2 face each other. The distance between the exciting coil L1 and feeding coil L2 is as comparatively small as 10 mm or less. Thus, the exciting coil L1 and feeding coil L2 are electromagnetically strongly coupled to each other. The number of windings of the feeding coil L2 is 7, cross-sectional shape of a coil conductor thereof is a rectangle of 0.2 mm×6.0 mm, and shape of the feeding coil L2 itself is a square of 2.80 mm×280 mm. When AC current I1 is made to flow in the exciting coil L1, an electromotive force occurs in the feeding coil L2 according to the principle of electromagnetic induction to cause AC current I2 to flow in the feeding coil circuit 120. The AC current I2 is considerably larger than the AC current I1. The values of the feeding coil L2 and capacitor C2 are set such that the resonance frequency fr1 is 100 kHz.

The receiving coil circuit 130 is a circuit in which the receiving coil L3 and capacitor C3 are connected in series. The feeding coil L2 and receiving coil L3 face each other. The distance between the feeding coil L2 and receiving coil L3 is as comparatively large as about 0.2 m to 1 m. The number of windings of the receiving coil L3 is 7, cross-sectional shape of a coil conductor thereof is a rectangle of 0.2 mm×6.0 mm, and shape of the receiving coil L3 itself is a square of 280 mm×280 mm. The values of the receiving coil L3 and capacitor C3 are set such that the resonance frequency fr1 is 100 kHz. When the feeding coil circuit 120 generates a magnetic field at the resonance frequency fr1, the feeding coil circuit 120 and receiving coil circuit 130 magnetically resonate, causing large AC current I3 to flow in the receiving coil circuit 130.

The capacitor C3 is a single plate type capacitor constituted by a first flat plate electrode 132 and a second flat plate electrode 134 facing each other. One end point A of the receiving coil L3 is connected to the first flat plate electrode 132, and other end point B thereof is connected to the second flat plate electrode 134. The details of the structure of the capacitor C3 will be described later using FIG. 3.

In the loading circuit 140, a loading coil L4 is connected to a load R through a rectification circuit 142. The receiving coil L3 and loading coil L4 are brought close to each other to such an extent that they substantially overlap each other. Therefore, the receiving coil L3 and loading coil. L4 are electromagnetically strongly coupled to each other. The number of windings of the loading coil L4 is 1, cross-sectional shape of a coil conductor thereof is a rectangle of 0.2 mm×6.0 mm, and shape of the loading coil L4 itself is a square of 300 mm×300 mm. When the AC current I3 is made to flow in the receiving coil L3, an electromotive force occurs in the loading coil L4 to cause AC current I4 to flow in the loading coil L4. The AC current I4 is converted into DC current I5 by the rectification circuit 142, and the DC current I5 is supplied to the load R. Thus, the AC power supplied from the AC power supply 112 is fed by the exciting circuit 110 and feeding coil circuit 120 to the receiving coil circuit 130 and loading circuit 140. After that, the AC power is converted into DC power by the rectification circuit 142, and then the DC power is taken from the load R.

The rectification circuit 142 is a known circuit including diodes D1 to D4 and a capacitor C1. The capacitor C1 is a smoothing capacitor inserted for cutting a high-frequency component. One endpoint C of the loading coil L4 is connected to a connection point G between the diodes D3 and D4, and the other end point D thereof is connected to a connection point E between the diodes D1 and D2. A connection point F between the diodes D3 and D1 is connected to one end of the capacitor C1 and one end of the load R, and a connection point H between the diodes D4 and D2 is connected to the other end of the capacitor C1 and other end of the load R.

The current I4 flowing from the end point D of the loading coil L4 to the connection point E of the rectification circuit 142 passes through the diode D2, load R, connection point F, diode D3, and connection point G in this order, and returns to the loading coil L4 through the end point C thereof. The current I4 flowing from the end point C of the loading coil L4 to the connection point G of the rectification circuit 142 passes through the diode D4, load R, connection point F, diode D1, and connection point E in this order, and returns to the loading coil L4 through the end point D thereof.

When the rectification circuit 142 or load R is connected in series to the receiving coil circuit 130, the Q-value of the receiving coil circuit 130 is degraded. Therefore, the receiving coil circuit 130 for power reception and loading circuit 140 for power extraction are separated from each other. In order to enhance power transmission efficiency, the center lines of the exciting coil L1, feeding coil L2, receiving coil L3, and loading coil L4 are preferably made to coincide with one another.

The rectification circuit 142 generates heat in the process of rectifying the AC current I4 into DC current I5. When large power is fed from the wireless power feeder 102 to the wireless power receiver 104, the heat generation amount of the rectification circuit 142 becomes large, so that a mechanism for effectively radiating/removing the heat of the rectification circuit 142 is required.

Since a frequency band not higher than 135 kHz is less constrained by Radio Act, it is preferable to set the resonance frequency fr1 at a low frequency band. In this case, it is necessary to increase the inductance of the feeding coil L3 or the electrostatic capacity of the capacitor C3. When the feeding coil L3 of the present embodiment is made to resonate at the resonance frequency fr1 of about 100 kHz, the capacitor C3 is required to have an electrostatic capacitance of about several 10 pF. In order to increase the electrostatic capacitance of the capacitor C3, the electrode plate area of the capacitor C3 needs to be increased. Thus, in the wireless power receiver 104 of the present embodiment, the large electrode plate area of the capacitor C3 is utilized for increasing the heat radiation efficiency of the rectification circuit 142.

Figure 3:
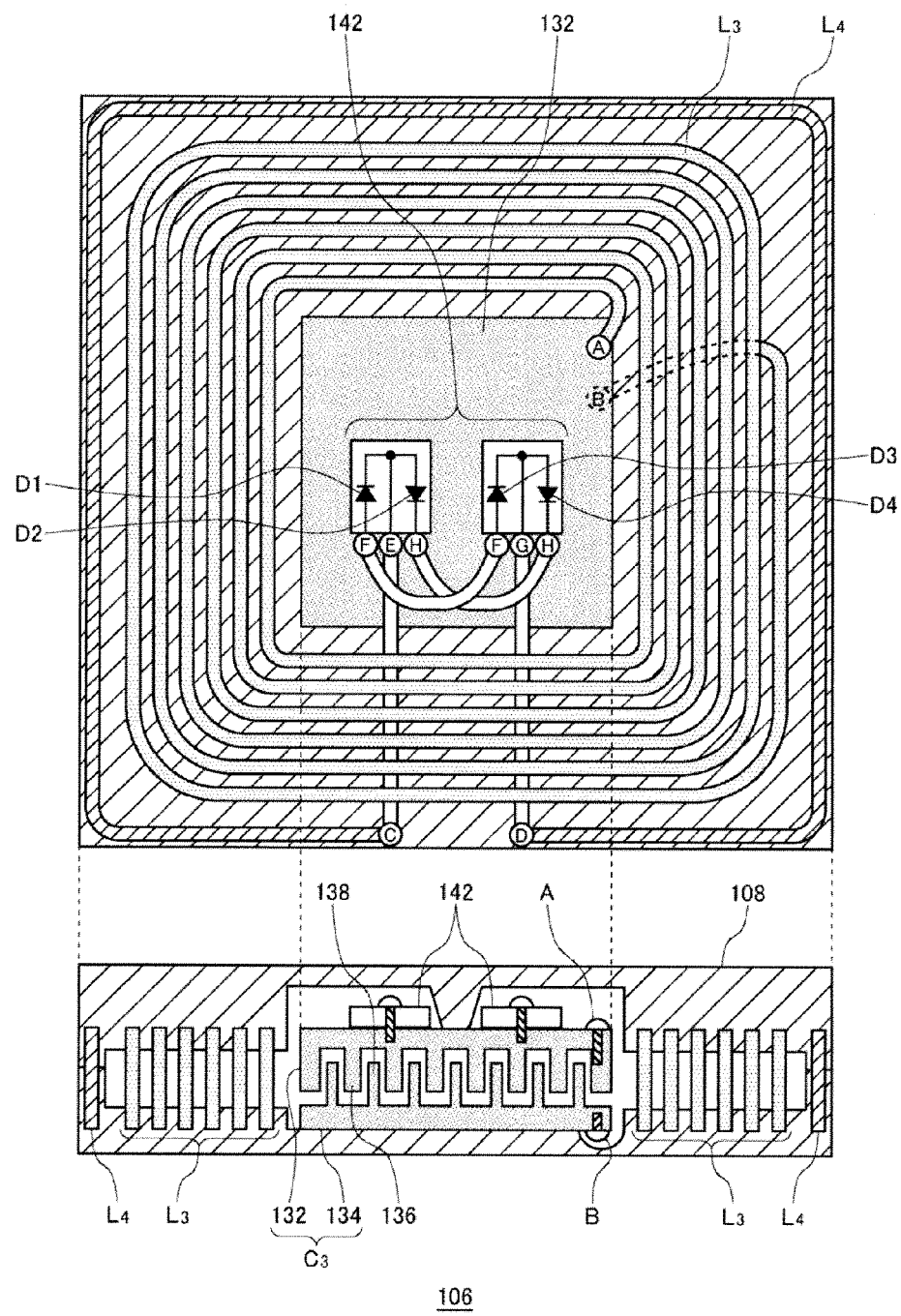
FIG. 3 is a development view of a receiving package.

FIG. 3 is a development view of a receiving package 106. The upper side of the drawing is the top view of the receiving package 106, and lower side is the side cross-sectional view thereof. The entire body or a part of the wireless power receiver 104 of the present embodiment is packaged as the receiving package 106. The receiving package 106 includes the receiving coil L3 and capacitor C3 of the receiving coil circuit 130, loading coil L4 of the loading circuit 140, and a part of the rectification circuit 142, all of which are encapsulated in a resin substrate 108.

The capacitor C3 is constituted by the first flat plate electrode 132 and a second flat plate electrode 134 facing each other. Although the first flat plate electrode 132 and second flat plate electrode 134 are made of aluminum, the materials of the electrodes are not especially limited, as long as they are excellent in electrical conductivity and heat conductivity. The capacitor C3 is placed at the center portion of the receiving package 106. In the case of the capacitor C3 of the present embodiment, no special dielectric body is inserted between the first flat plate electrode 132 and second flat plate electrode 134. It is effective to insert a dielectric body in order to achieve size reduction of the capacitor C3. However, if the dielectric body is inserted, dielectric loss may occur, so that only air is allowed to exist between the first flat plate electrode 132 and second flat plate electrode 134.

The receiving coil L3 is wound around the capacitor C3. The coil conductor cross-sectional shape of the receiving coil L3 is substantially a rectangle, and the longitudinal direction of the rectangle and height direction of the capacitor C3 coincide with each other. The end point A of the receiving coil L3 is connected to the first flat plate electrode 132, and the end point B thereof is connected to the second flat plate electrode 134.

The loading coil L4 is wound outside the receiving coil L3. The coil conductor cross-sectional shape of the loading coil L4 is also substantially a rectangle, and the longitudinal direction of the rectangle and height direction of the capacitor C3 coincide each other. The rectification circuit 142 is placed on the first flat plate electrode 132. The rectification circuit 142 is fixed to the first flat plate electrode 132 by means of screws, adhesive or the like. In the present embodiment, the rectification circuit 142 is fixed by means of screws made of an insulating material such as a polycarbonate.

The two end points C and D of the loading coil L4 are connected respectively to connection points G and E of the rectification circuit 142. Not only the diodes D1 to D4, but also the capacitor C1 may be placed on the first flat plate electrode 132. Alternatively, the capacitor C1 may be externally attached to the receiving package 106. Similarly, the load R may be placed on the first flat plate electrode 132 or may be externally attached to the receiving package 106.

With the configuration of the receiving package 106, the most part of the wireless power receiver 104 is put in one package. The receiving coil. L3 and loading coil L4 overlap each other with a distance between them being substantially zero, so that they are magnetically strongly coupled to each other. Further, the receiving coil L3 and loading coil L4 each have a coil cross-sectional shape of substantially a rectangle, so that even when the coils are wound in multiple turns around the capacitor C3, the size (area of the square surface) of the receiving package 106 is unlikely to increase. The longitudinal direction length of the coil conductor cross-sectional shape is preferably equal to the height of the capacitor C3. With this configuration, the compact receiving package 106 including the main part of the wireless power receiver 104 can be formed.

Heat generated from the rectification circuit 142 is transferred to the first flat plate electrode 132. The transfer of the heat generated from the rectification circuit 142 results in effective heat radiation from the rectification circuit 142. In particular, the area of the first flat plate electrode 132 is increased when the resonance frequency fr1 is low and, accordingly, the heat capacity of the first flat plate electrode 132 is increased, allowing more effective heat radiation. Further, silicone or the like may be applied onto the bonding surface between the rectification circuit 142 and first flat plate electrode 132 so as to further increase the heat radiation effect.

The first flat plate electrode 132 has a plurality of protrusions 136. The shape of each of the protrusions 136 may be a flat-plate shape or columnar shape. Formation of such a plurality of protrusions 136 allows they first flat plate electrode 132 to function more suitably as so-called a "heat sink". That is, the surface area of the first flat plate electrode 132 is increased to increase the heat radiation effect.

The second flat plate electrode 134 also has a plurality of protrusions 138. The shape of each of the protrusions 138 may also be a flat-plate shape or columnar shape. As illustrated in FIG. 3, the protrusions 136 of the first flat plate electrode 132 and protrusions 138 of the second flat plate electrode 134 are formed so as to face and overlap each other alternately. In other words, the protrusions 136 and protrusions 138 face each other in a comb-like manner. This allows heat transferred from the rectification circuit 142 to the first flat plate electrode 132 to be easily transferred to the second flat plate electrode 134 through the protrusions 138 after radiated from the protrusions 136.

The second flat plate electrode 134 may completely be encapsulated in the resin substrate 108 as illustrated in FIG. 3 or may partly be exposed from the resin substrate 108. A configuration in which the second flat plate electrode 134, first flat plate electrode 132, and rectification circuit 142 are partly exposed from the resin substrate 108 is advantageous for increasing the heat radiation effect. Further, the receiving package 106 itself may be cooled by air or water. Further, projections may be provided in the resin substrate 108 for increasing the heat radiation effect of the entire receiving package 106.

Figure 4:
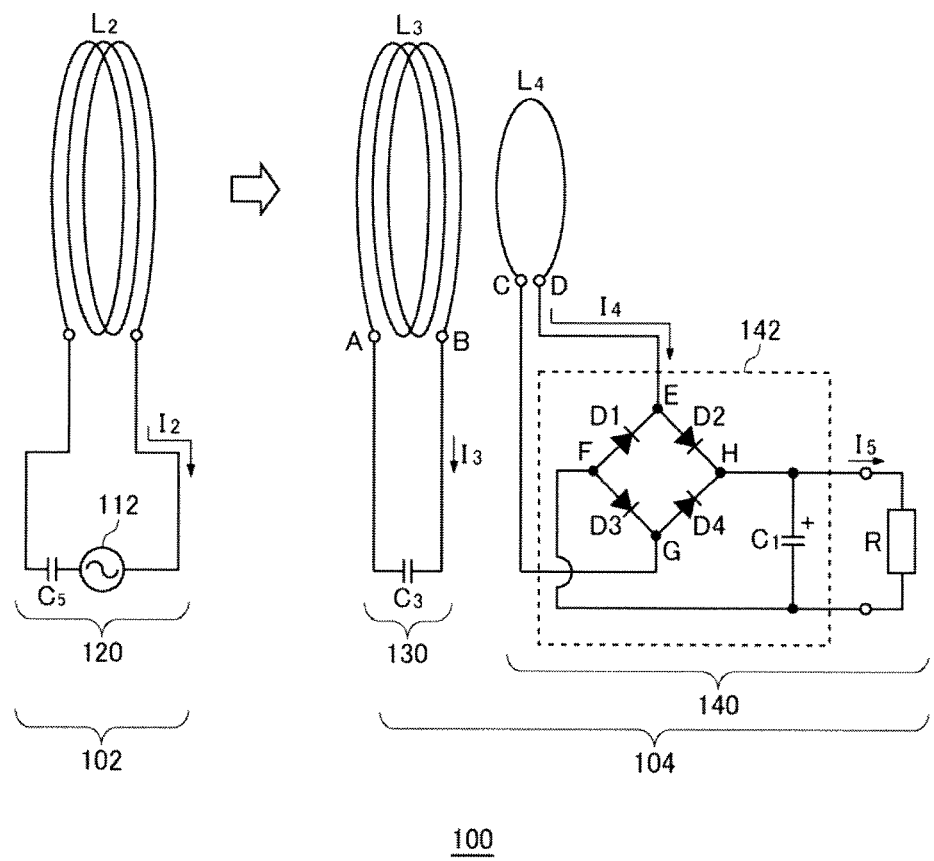
FIG. 4 is another example of a system configuration view of the wireless power transmission system according to the first embodiment.

FIG. 4 is another example of a system configuration view of the wireless power transmission system 100 according to the first embodiment. While the AC power supply 112 is used to drive the exciting coil L1 in the configuration illustrated in FIG. 2, the AC power supply 112 may be used to directly drive the feeding coil L2 as illustrated in FIG. 4. This configuration can eliminate the need to provide the exciting circuit 110, which is advantageous for size reduction of the wireless power feeder 102. The configuration of FIG. 2 in which the exciting coil L1 is used has an advantage that the Q-value of the power feeding side is more easily increased than in the configuration of FIG. 4.

Figure 5:
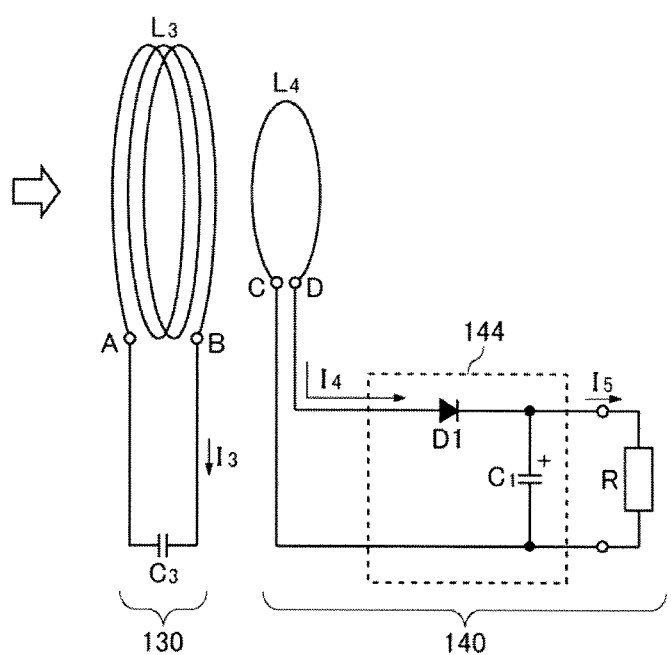
FIG. 5 is a first another example of a system configuration view of a wireless power receiver according to the first embodiment.

FIG. 5 is a first another example a system configuration view of the wireless power receiver 104 according to the first embodiment. While the rectification circuit 142 included in the loading circuit 140 is constituted by the four diodes D1 to D4 and capacitor C1 in the configuration illustrated in FIG. 2, a configuration may be adopted in which a rectification circuit 144 including a single diode D1 and capacitor C1 is used to rectify the AC current I4, as illustrated in FIG. 5. Although the rate of the pulsating flow is higher in the rectification circuit 144 of FIG. 5 than in the rectification circuit 142, the configuration of the rectification circuit 144 has an advantage of simplifying the configuration of the wireless power receiver 104 because of use of only a single diode D1.

Figure 6:
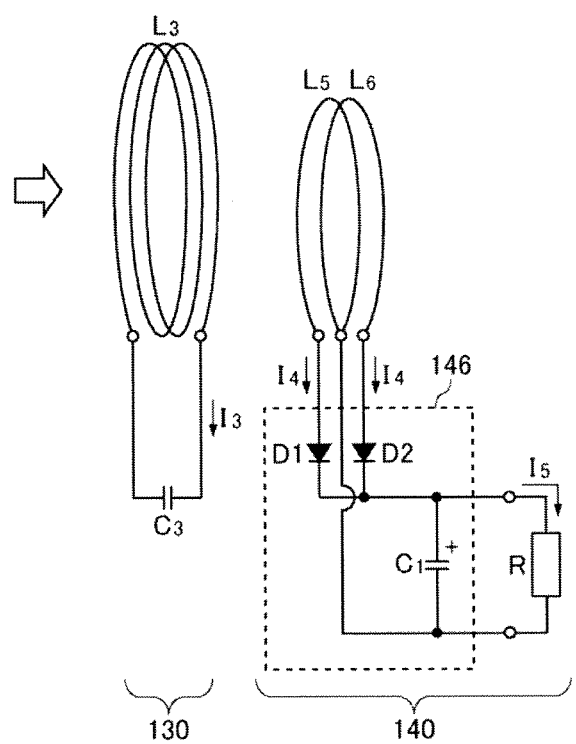
FIG. 6 is a second another example of a system configuration diagram of the wireless power receiver according to the first embodiment.

FIG. 6 is a second another example of a system configuration view of the wireless power receiver 104 according to the first embodiment. In the configuration illustrated in FIG. 6, the half-wave of AC power is received by each of two loading coils L5 and L6. The AC power received by the loading coil L5 is rectified by the diode D1 and capacitor C1 of the rectification circuit 146, and the AC power received by the loading coil L6 is rectified by the diode D2 and capacitor C1 of the rectification circuit 146.

Figure 7:
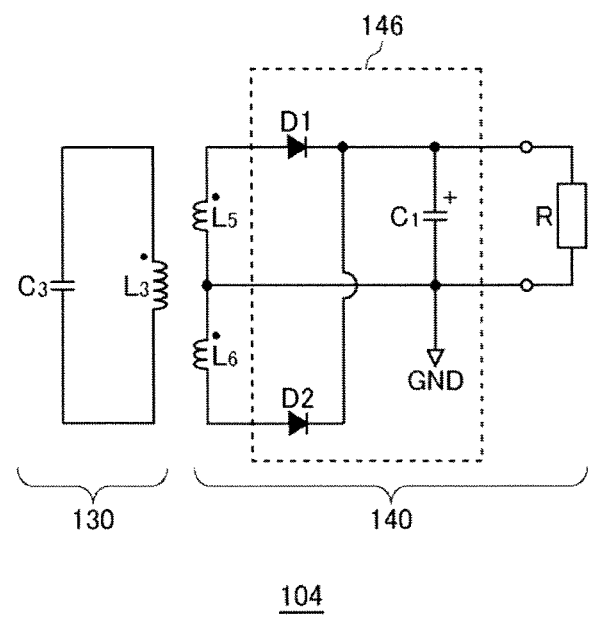
FIG. 7 is a circuit diagram of the wireless power receiver of FIG. 6.

FIG. 7 is a circuit diagram of the wireless power receiver 104 of FIG. 6. The middle point between the loading coils L5 and L6 are grounded. The rate of the pulsating flow is lower than in the wireless power receiver 104 of FIG. 5

Second Embodiment

Figure 8:
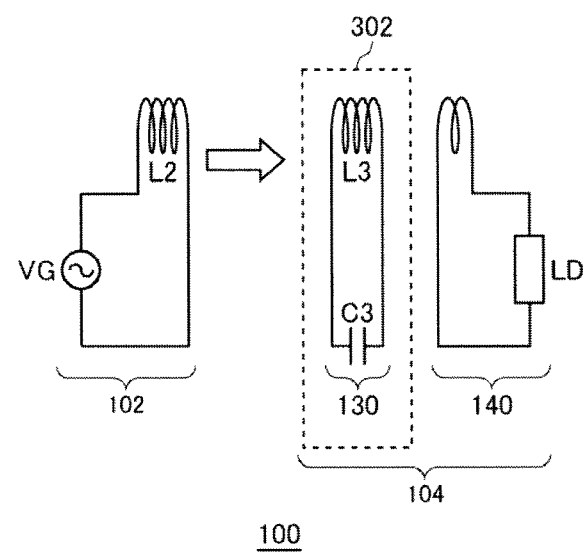
FIG. 8 is a view illustrating operation principle of a wireless power transmission system according to a second embodiment of the present invention.

FIG. 8 is a view illustrating operation principle of the wireless power transmission system 100 according to a second embodiment. As in the case of the first embodiment, the wireless power transmission system 100 according to the second embodiment includes the wireless power feeder 102 and wireless power receiver 104. However, although the wireless power receiver 104 includes the power receiving LC resonance circuit 302, the wireless power feeder 102 does not include the power feeding LC resonance circuit 300. That is, the power feeding coil L2 does not constitute a part of the LC resonance circuit. More specifically, the power feeding coil L2 does not form any resonance circuit with other circuit elements included in the wireless power feeder 102. No capacitor is connected in series or in parallel to the power feeding coil L2. Thus, the power feeding coil L2 does not resonate in a frequency at which power transmission is performed.

The power feeding source VG supplies AC current of the resonance frequency fr1 to the power feeding coil L2. The power feeding coil L2 does not resonate but generates an AC magnetic field of the resonance frequency fr1. The power receiving AC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 102. The power feeding coil L2 does not constitute apart of the power feeding LC resonance circuit, so that the wireless power feeder 102 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 102 does not contain the power feeding LC resonance circuit 300, if the wireless power receiver 104 includes the power receiving LC resonance circuit 302, the wireless power feeding of a magnetic field resonance type can be achieved.

Even when the power feeding coil L2 and power receiving coil L3 are magnetic-field-coupled to each other, a new resonance circuit (new resonance circuit formed by coupling of resonance circuits) is not formed due to absence of the capacitor C2. In this case, the stronger the magnetic field coupling between the power feeding coil L2 and power receiving coil L3, the greater the influence exerted on the resonance frequency of the power receiving LC resonance circuit 302. By supplying AC current of this resonance frequency, that is, a frequency near the resonance frequency fr1 to the power feeding coil L2, the wireless power feeding of a magnetic field resonance type can be achieved. In this configuration, the capacitor C2 need not be provided, which is advantageous in terms of size and cost.

Figure 9:
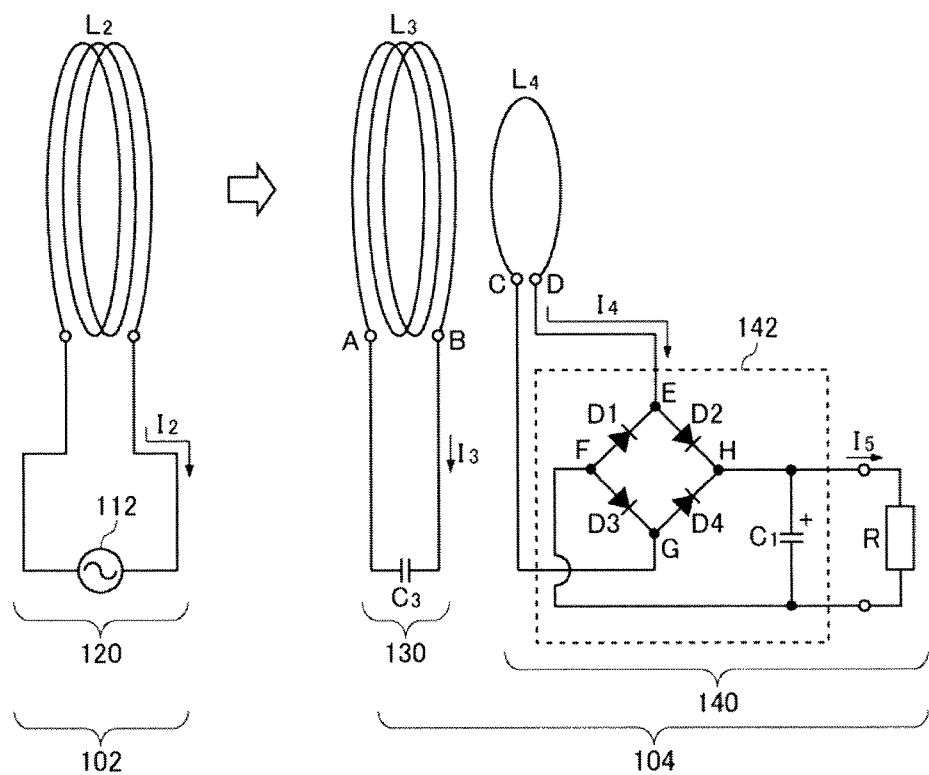
FIG. 9 is a system configuration view of the wireless power transmission system according to the second embodiment.

FIG. 9 is a system configuration view of the wireless power transmission system 100 according to the second embodiment. In the wireless power transmission system 100 of the second embodiment, the capacitor C2 is omitted. Other points are the same as the first embodiment.

The wireless power transmission system 100 has been described based on the preferred embodiments. According to the abovementioned embodiments, by utilizing the capacitor C3 that the wireless power receiver 104 inevitably includes as a heat sink, heat generated from the rectification circuits 142, 144, 146, and the like can effectively be removed. Although the rectification circuit is targeted as a heating element in the above embodiments, the load R may be placed on the first flat plate electrode 132 for heat radiation thereof. Further, another component included in the loading circuit 140 that can be a heating element may be placed on the first flat plate electrode 132. For example, in the case where transistors or various control circuits are connected to the loading circuit 140, they may be placed on the first flat plate electrode 132. As a matter of course, the heating element may be placed not only on the first flat plate electrode 132 but also on both the first and second flat plate electrodes 132 and 134.

By forming the protrusions 136 in the first flat plate electrode 132, it is possible to increase the heat capacity of the first flat plate electrode 132 and to enhance the heat radiation effect of the first flat plate electrode 132. Further, by forming the protrusions 138 in the second flat plate electrode 134 and making the protrusions 136 and protrusions 138 face each other, it is possible to allow heat to escape more easily.

Further, winding the feeding coil. L3, loading coil L4, and the like, each of which uses a so-called rectangular wire, outside the capacitor C3 can make the size of the wireless power receiver 104 compact. In Patent Document 5, a capacitor is provided outside the coil, which increases the size of a receiving antenna (refer to FIG. 9). On the other hand, in the receiving package 106 according to the present embodiments, the capacitor C3 is provided inside the receiving coil L3, thereby effectively utilizing the space in the receiving package 106.

The present invention has been described based on the above embodiments. It should be understood by those skilled in the art that the above embodiments are merely exemplary of the invention, various modifications may be made to the components of the present invention and a combination of processing processes, and that all such modifications are included within the scope of the claims of the present invention.

The "AC power" used in the wireless power transmission system 100 may be transmitted not only as an energy but also as a signal. Even in the case where an analog signal or digital signal is fed by wireless, the wireless power transmission method of the present invention may be applied.

What is claimed:
1. A wireless power receiver including a receiving coil for wirelessly receiving AC power fed from a feeding coil by using a magnetic field resonance phenomenon between the feeding coil and the receiving coil, the receiver comprising:
- a receiving coil circuit that includes a capacitor comprising first and second flat plate electrodes facing each other and the receiving coil; and
- a loading circuit that includes a loading coil that is magnetically coupled to the receiving coil to receive the AC power from the receiving coil and a load to which the AC power is supplied from the loading coil,
- a heating element included in the loading circuit being placed directly on one of the first and second flat plate electrodes, wherein
- the receiving coil is wound around the capacitor, and
- the capacitor is disposed at a center area substantially equidistant from the receiving coil wounding around the capacitor.

2. The wireless power receiver according to claim 1, wherein
- the loading circuit further comprises a rectification circuit configured to rectify the AC power received by the loading coil and supplies the resultant power to the load, and
- the heating element is the rectification circuit placed directly on the one of the first and second flat plate electrodes.

3. The wireless power receiver according to claim 1, wherein
- the heating element is placed directly on the first flat plate electrode, and
- the first flat plate electrode has a plurality of protrusions.

4. The wireless power receiver according to claim 3, wherein
- the second flat plate electrode opposite to the first flat plate electrode has a plurality of protrusions, and
- the protrusions of the first flat plate electrode and those of the second flat plate electrode are alternately arranged between the first flat plate electrode and the second flat plate electrode.

5. The wireless power receiver according to claim 1, wherein the loading coil is wound around the receiving coil.

6. The wireless power receiver according to claim 5, wherein an axial direction of the loading coil and opposing directions of the first flat plate electrode and the second flat plate electrode coincide with each other.

7. The wireless power receiver according to claim 5, wherein a wire of at least one of the receiving coil and loading coil has a rectangular shape in cross-section, the rectangular shape has longer sides and shorter sides, and the longer sides extend in a direction perpendicular to a direction of winding the wire.

8. The wireless power receiver according to claim 7, wherein a length of the longer sides is equal to a height of the capacitor.

9. The wireless power receiver according to claim 1, wherein at least one of the receiving coil and loading coil has a rectangular shape in coil cross-section.

10. The wireless power receiver according to claim 1, wherein the receiving coil circuit resonates at a resonance frequency of the feeding coil.

11. The wireless power receiver according to claim 1, wherein at least a part of the wireless power receiver is packaged.

12. The wireless power receiver according to claim 1, wherein an axial direction of the receiving coil and opposing directions of the first flat plate electrode and the second flat plate electrode coincide with each other.

13. A wireless power transmission system comprising:
- the wireless power receiver as claimed in claim 1;
- the feeding coil; and
- a power supply circuit that supplies the AC power to the feeding coil.

14. The wireless power transmission system according to claim 13, wherein the power supply circuit supplies the AC power from the feeding coil that does not substantially resonate with power feeding side circuit elements to the receiving coil.

15. The wireless power transmission system according to claim 13, wherein the feeding coil does not constitute a resonance circuit that resonates with power feeding side circuit elements at a resonance point corresponding to the resonance frequency of the receiving coil.

16. The wireless power transmission system according to claim 13, wherein no capacitor is inserted in series or in parallel to the feeding coil.

17. The wireless power transmission system according to claim 13, wherein the feeding coil is connected to the capacitor to constitute a circuit that resonates at the resonance frequency of the receiving coil.

18. The wireless power transmission system according to claim 13, wherein
- the loading coil is wound around the receiving coil, and
- a wire of at least one of the receiving coil and loading coil has a rectangular shape in cross-section, the rectangular shape has longer sides and shorter sides, and the longer sides extend in a direction perpendicular to a direction of winding the wire.

* * * * *